(12) United States Patent
Arakawa et al.

(10) Patent No.: US 10,951,539 B2
(45) Date of Patent: Mar. 16, 2021

(54) DATA PROCESSING DEVICE

(71) Applicant: Mitsubishi Electric Corporation, Tokyo (JP)

(72) Inventors: Takemasa Arakawa, Tokyo (JP); Takahiro Isaka, Tokyo (JP); Masaaki Hayashi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/040,549

(22) PCT Filed: Mar. 29, 2018

(86) PCT No.: PCT/JP2018/013325
§ 371 (c)(1),
(2) Date: Sep. 23, 2020

(87) PCT Pub. No.: WO2019/186920
PCT Pub. Date: Oct. 3, 2019

(65) Prior Publication Data
US 2021/0044534 A1    Feb. 11, 2021

(51) Int. Cl.
*H04L 12/863* (2013.01)
*H04L 12/861* (2013.01)

(52) U.S. Cl.
CPC .......... *H04L 47/6215* (2013.01); *H04L 49/90* (2013.01)

(58) Field of Classification Search
CPC .................. H04L 47/6215; H04L 49/90
See application file for complete search history.

(56) References Cited

U.S. PATENT DOCUMENTS 6,205,150 B1 * 3/2001 Ruszczyk ............. H04L 47/564
370/412
9,467,500 B2   10/2016 Maturana et al.

FOREIGN PATENT DOCUMENTS

| JP | 2009-199499 A | 9/2009 |
| JP | 2009-267496 A | 11/2009 |
| JP | 2011-009981 A | 1/2011 |
| JP | 2013-182361 A | 9/2013 |
| JP | 2014-106728 A | 6/2014 |

OTHER PUBLICATIONS

International Search Report and Written Opinion dated Jun. 26, 2018 for PCT/JP2018/013325 filed on Mar. 29, 2018, 7 pages including English Translation of the International Search Report.
Notification of Reasons for Refusal received for Japanese Patent Application No. 2018-557962, dated Nov. 27, 2018, 5 pages including English Translation.

(Continued)

*Primary Examiner* — Siming Liu
(74) *Attorney, Agent, or Firm* — Xsensus LLP

(57) ABSTRACT

A data processing device includes a data receiving unit to receive data, a plurality of input queues that are associated one-to-one with transmission sources of data received by the data receiving unit and that each store data from the associated transmission source, and a data sorting unit to read data stored in each of the plurality of input queues from each of the input queues, and store the data in an output queue such that higher priority data is to be processed first.

32 Claims, 11 Drawing Sheets

(56) References Cited

OTHER PUBLICATIONS

Notification of Reasons for Refusal received for Japanese Patent Application No. 2018-557962, dated Apr. 16, 2019, 6 pages including English Translation.
Decision to Grant a Patent received for Japanese Patent Application No. 2018-557962, dated Jul. 9, 2019, 4 pages including English Translation.
Examination Report from Intellectual property office for Taiwanese application No. 108109660 dated Apr. 15, 2020, 12 pages including English Translation.

* cited by examiner

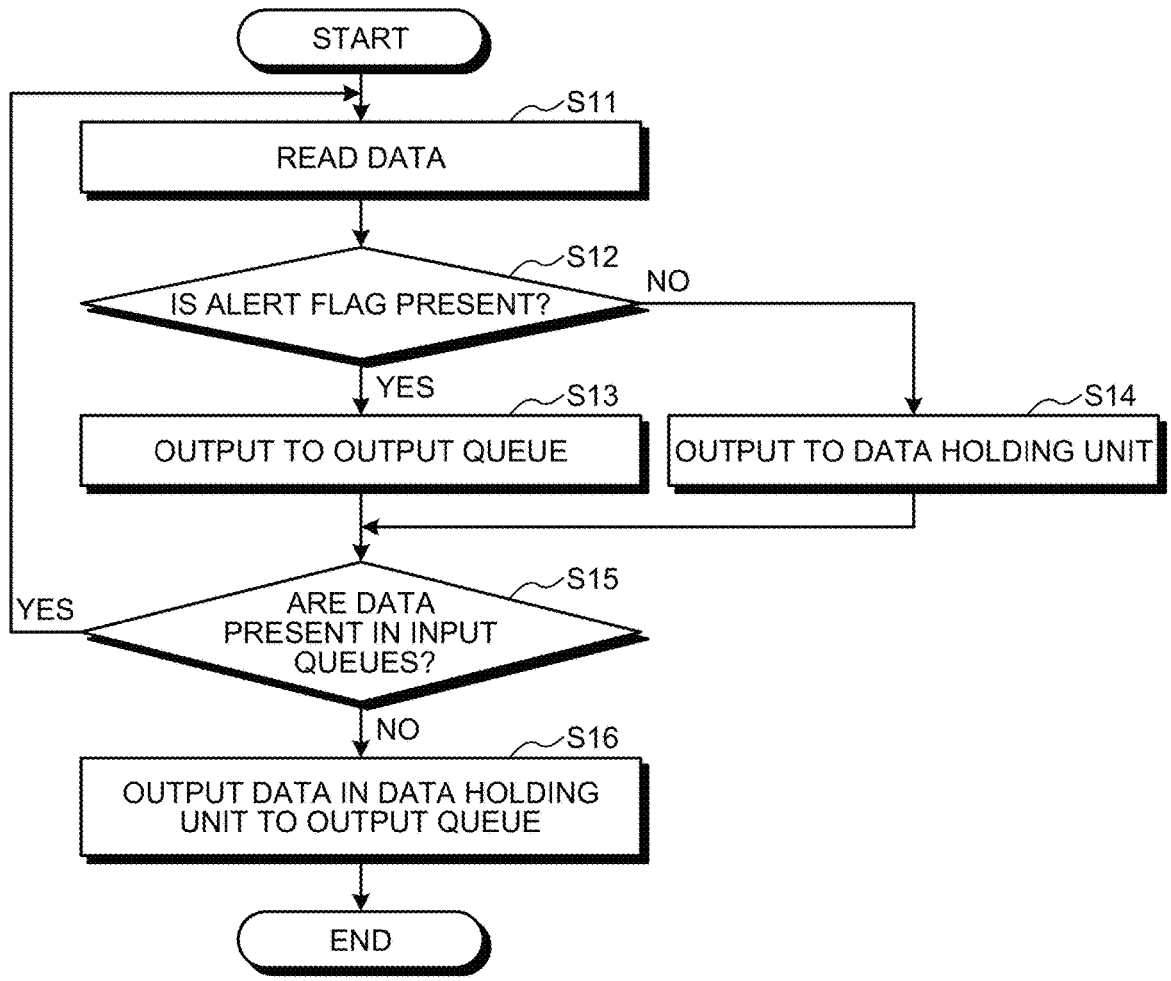

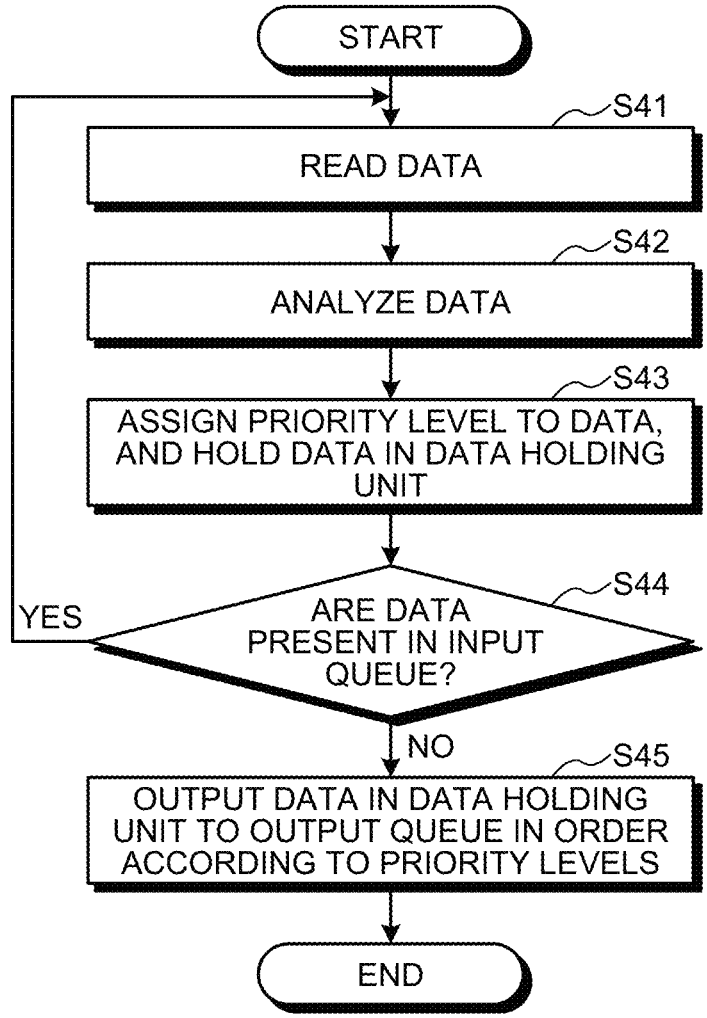

DATA PROCESSING DEVICE

CROSS-REFERENCE TO RELATED APPLICATION

The present application is based on PCT filing PCT/JP2018/013325, filed Mar. 29, 2018, the entire contents of which are incorporated herein by reference.

FIELD

The present invention relates to a data processing device included in a system for managing data collected in production sites.

BACKGROUND

In recent years, systems that obtain various data collected at each of a plurality of production sites via a network such as the Internet and centrally manage the data have been widely used. Checking the centrally managed data enables the conditions of each production site to be obtained. In addition, when trouble occurs, the data can be effectively used for efficient identification of the cause, or the like.

Note that, in transmitting and receiving data via a network, the upper limit of the data size that can be transmitted in one process is determined by a communication protocol or the like, and data having a larger size than the upper limit is divided before being transmitted. The divided data after being received are put together and merged into the original state. In addition, in management of data collected at production sites, data from one production site are desired to be managed together so that the production site from which each piece of data has been collected can be readily identified. Thus, a data processing device that processes data in a system for obtaining and managing data from respective production sites, for example, includes a buffer for each production site so that data transmitted from the same transmission source can be held together, and data collected from one production site are thus stored in one buffer. This is convenient when merging divided data, and facilitates management of data obtained from the same production site.

For example, Patent Literature 1 describes an information processing device that processes requests, which are data from a plurality of clients. The information processing device described in Patent Literature 1 provides queues associated with the individual clients and, upon receiving a request, stores the request in a queue associated with the client indicated by identification information included in the request. Application of the configuration of Patent Literature 1 enables data from one transmission source to be held together and processed.

CITATION LIST

Patent Literature

Patent Literature 1: Japanese Patent Application Laid-open No. 2014-106728

SUMMARY

Technical Problem

Data transmitted from production sites include various types of data, and some of the data are desired to be processed in preference to other data. For example, when data indicating an equipment failure is transmitted, this requires quick execution of a process of notifying a manager of the occurrence of failure. According to the invention described in Patent Literature 1, data from the same transmission source can be held together, but the held data are merely processed in the order in which the data are received, and the order of the data to be processed cannot be changed.

The present invention has been made in view of the above, and an object thereof is to provide a data processing device capable of changing the order of processing of data desired to be preferentially processed.

Solution to Problem

To solve the aforementioned problems and achieve the object, a data processing device according to an aspect of the present invention includes a data receiving unit to receive data, and a plurality of input queues associated one-to-one with transmission sources of data received by the data receiving unit, the input queues each storing the data from the associated transmission source. The data processing device also includes a data sorting unit to read data stored in each of the plurality of input queues from each of the input queues, and store the data in an output queue such that higher priority data is to be processed first.

Advantageous Effects of Invention

The data processing device according to the present invention produces an effect of enabling the processing order to be changed when data desired to be preferentially processed is received.

BRIEF DESCRIPTION OF DRAWINGS

FIG. 6 is a flowchart illustrating an example of operation of sorting data performed by the data sorting unit of the data processing device according to the first embodiment.

FIG. 7 is a diagram illustrating an example of operation of the data sorting unit included in the data processing device according to the first embodiment.

FIG. 16 is a flowchart illustrating an example of operation of sorting data performed by the data sorting unit of the data processing device according to the fifth embodiment.

FIG. 17 is a diagram illustrating an example of a configuration of a table used by the data sorting unit of the data processing device according to the fifth embodiment.

DESCRIPTION OF EMBODIMENTS

A data processing device according to embodiments of the present invention will be described in detail below with reference to the drawings. Note that the present invention is not limited to the embodiments.

First Embodiment

Figure 1:
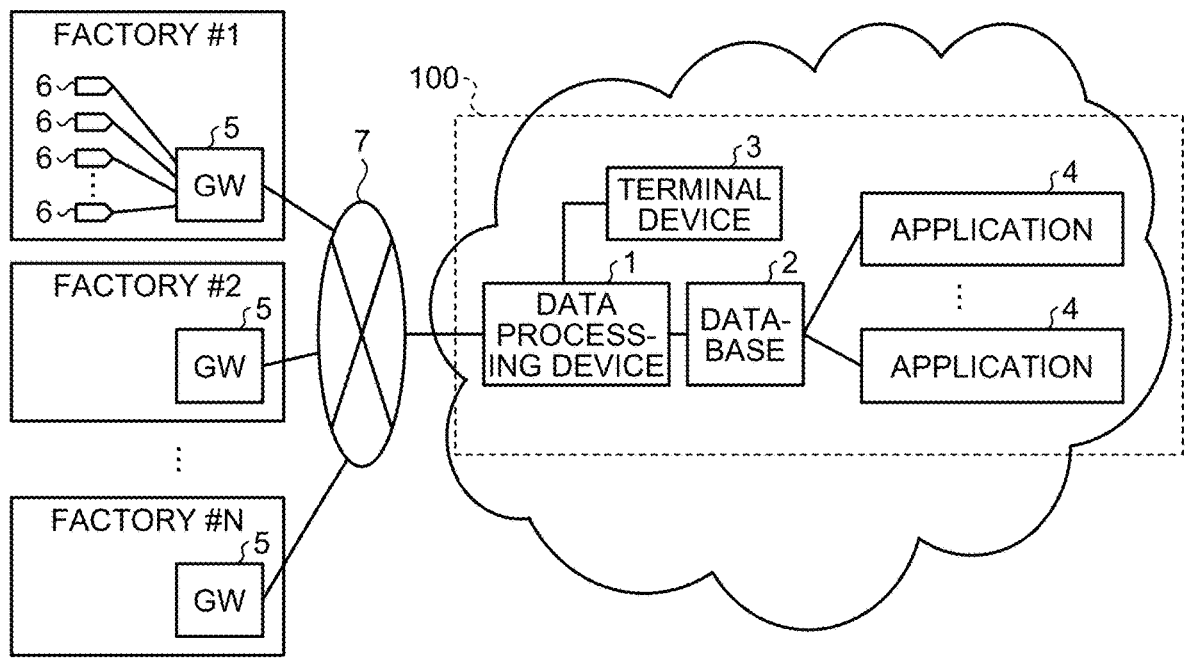
FIG. 1 is a diagram illustrating an example of a configuration of a data processing system including a data processing device according to a first embodiment.

FIG. 1 is a diagram illustrating an example of a configuration of a data processing system including a data processing device according to a first embodiment of the present invention. A data processing system 100 includes a data processing device 1, a database 2, a terminal device 3, and applications 4. One or more applications 4 are present. The number of terminal devices 3 may be more than one.

The data processing system 100 is connected, via a network 7, with gateways (GWs) 5 each installed in one of a plurality of factories. Data outputting devices 6 that generate and output data are installed in each of the factories, and each data outputting device 6 has a function for communicating with the associated gateway 5. Note that, in FIG. 1, only data outputting devices 6 installed in a factory #1 are illustrated, and data outputting devices 6 installed in factories other than the factory #1 are not illustrated. The data outputting devices 6 are sensors, for example, or more specifically, temperature sensors, humidity sensors, optical sensors, sound sensors, voltage sensors, current sensors, infrared sensors, and the like. In addition, examples of the data outputting devices 6 include devices that determine an abnormal operation, occurrence of failure, or the like of various devices such as industrial equipment and control devices on the basis of sensor values obtained by sensing performed by sensors, generate data indicating the determination results, and output the data. In addition, examples of the data outputting devices 6 include devices that detect operation of a switch for stopping industrial equipment or the like in an emergency when such operation is performed, generate data indicating the detection results, and output the data. Examples of the data outputting devices 6 further include industrial equipment and control devices that control industrial equipment.

The data processing system 100 obtains and processes data output from the data outputting devices 6 installed in each of the factories. The processing here includes various processes performed using obtained data, such as a process of registering obtained data in the database 2, a process of analyzing obtained data, a process of registering a result of analysis of data in the database 2, and a process of providing a service using obtained data or a result of analysis of data.

The data processing device 1 receives data output from the data outputting devices 6 in each factory via the gateway 5. The data processing device 1 also performs streaming analysis on the received data. In the streaming analysis performed by the data processing device 1, a process of analyzing whether or not received data corresponds to specific data desired to be preferentially processed, a process of sorting data on the basis of an analysis result, and the like are performed. The data processing device 1 also determines devices to which received data are to be output on the basis of a result of analysis of the data, and outputs the data to the determined devices.

The database 2 receives and stores data output from the data processing device 1.

The terminal device 3 is a personal computer, a portable communication terminal, or the like, and has functions for communicating with the data processing device 1. When data indicating an alert is received from the data processing device 1, the terminal device 3 notifies users of the alert. The notification from the terminal device 3 to users is performed by both of display and sound, or either one of display and sound, for example.

An application 4 is implemented by a computer by executing an application program. In other words, an application 4 is a computer executing an application program. An application 4 performs processing by using necessary types of data from data stored in the database 2. Examples of the applications 4 include a machine learning tool and a business intelligence tool. An application 4, for example, estimates the state of degradation of each of components constituting industrial equipment by analyzing data stored in the database 2, determines the time to replace the component, and notifies the user of the determined time.

Figure 2:
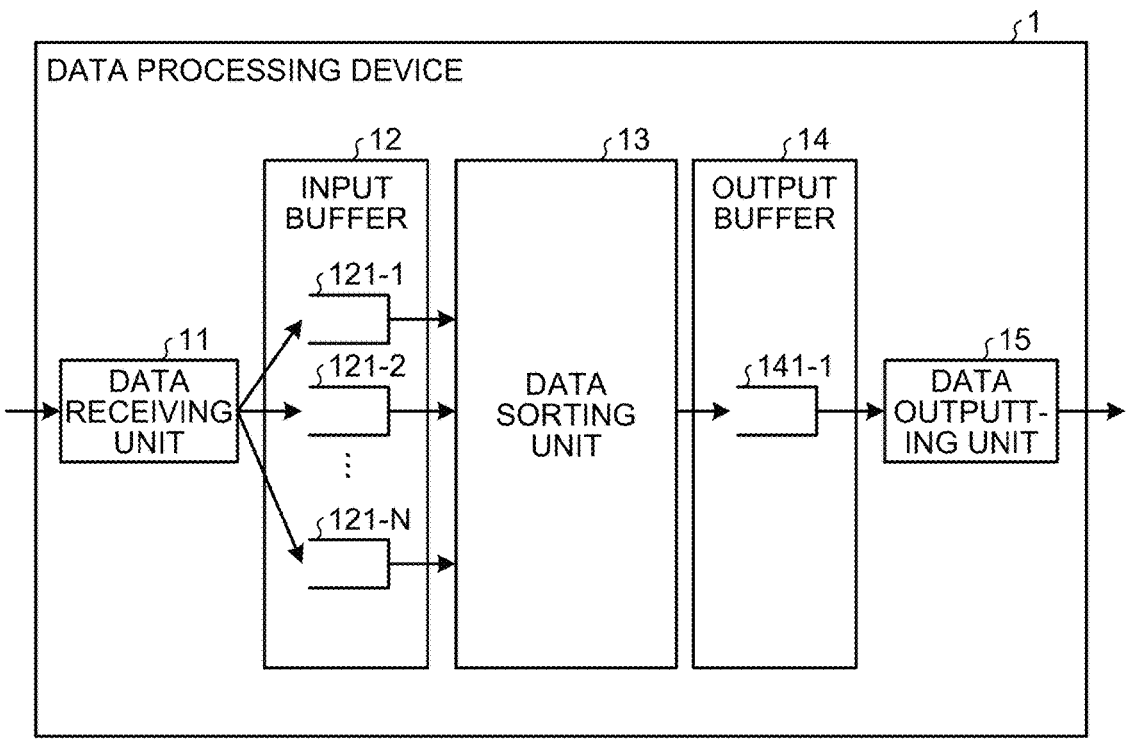
FIG. 2 is a diagram illustrating an example of a configuration of a data processing device according to the first embodiment.

FIG. 2 is a diagram illustrating an example of a configuration of the data processing device according to the first embodiment. The data processing device 1 according to the first embodiment includes a data receiving unit 11, an input buffer 12, a data sorting unit 13, an output buffer 14, and a data outputting unit 15. The input buffer 12 is constituted by a plurality of input queues 121-1 to 121-N. In the description below, the input queues 121-1 to 121-N will be referred to as input queues 121 when the individual input queues 121 need not be distinguished from each other.

Each of the input queues 121 is associated on one-to-one basis with any one of the gateways 5 in the factories illustrated in FIG. 1. In the present embodiment, assume that the input queue 121-1 is associated with the gateway 5 of the factory #1, the input queue 121-2 is associated with the gateway 5 of the factory #2, . . . , and the input queue 121-N is associated with the gateway 5 of the factory N. Note that the number of input queues 121 constituting the input buffer 12 may be any number equal to or larger than the number of gateways 5 in the factories, and need not be the same number as the number of gateways 5. The output buffer 14 is constituted by an output queue 141-1.

The data receiving unit 11 of the data processing device 1 receives data in the form of messages transmitted from the gateways 5 of the respective factories, and stores the received data in respective input queues 121 associated with the gateways 5 from which the data are transmitted. Upon receiving data transmitted from the gateway 5 of the factory #1, for example, the data receiving unit 11 stores the data in the input queue 121-1.

Figure 3:
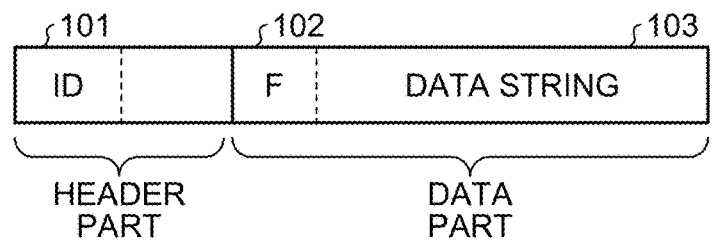
FIG. 3 is a diagram illustrating an example of a configuration of data received by the data processing device according to the first embodiment.

A configuration of data in the form of a message received by the data processing device 1 from each gateway 5 will now be described. FIG. 3 is a diagram illustrating an example of a configuration of data received by the data processing device according to the first embodiment. As illustrated in FIG. 3, data in the form of a message received by the data processing device 1 is constituted by a header part and a data part. The header part includes a gateway ID 101, which is identification information on the gateway 5 that is the transmission source, identification information on the destination of the data, information indicating whether or not the data is transmitted in a divided state, and the like. Note that, in FIG. 3, the gateway ID is expressed as "ID". In FIG. 3, information other than the gateway ID is not illustrated. The data part includes an alert flag 102 expressed as "F", and a data string 103. The alert flag 102 is data used for notification of occurrence of abnormality such as failure of industrial equipment. For example, the alert flag 102 being "0" indicates that "no abnormality is present", and the alert flag 102 being "1" indicates that "abnormality is present". When the alert flag is set, that is, when the alert flag 102 is set to "1", the data corresponds to data desired to be preferentially processed. Data desired to be preferentially processed is high priority data. The data string 103 is data other than the alert flag. For example, when the data outputting device 6 is a sensor, the data string 103 includes data indicating a sensing result and information on the sensor that is the data outputting device 6. Information on sensors includes information necessary for managing sensing results and information necessary for various applications to use sensing results, such as the types, the installation positions, the identification information, and the units of sensing results of the sensors. Note that the arrangement of the gateway ID 101, the alert flag 102, and the data string 103 illustrated in FIG. 3 is an example, and the arrangement is not limited to the illustrated example. The alert flag may be set by a data outputting device 6 or by a determination device for determining data output from a data outputting device 6, which is provided between the data outputting device 6 and a gateway 5, for example. The alert flag is set when a predetermined flag setting condition is satisfied. For example, the alert flag is set when data output from a data outputting device 6 indicate an abnormal value.

Upon receiving data in the form of a message, the data receiving unit 11 checks the gateway ID 101, and stores data in an input queue associated with the value of the gateway ID 101.

The data sorting unit 13 of the data processing device 1 sequentially reads and analyzes data stored in each of the plurality of input queues 121 from each of the input queues 121, and stores the data in the output queue 141-1 in order according to the analysis result. More specifically, the data sorting unit 13 checks whether or not data with the alert flag being set is present among the read data, and if data with the alert flag being set is present, the data sorting unit 13 causes the data to be stored first in the output queue 141-1.

Figure 4:
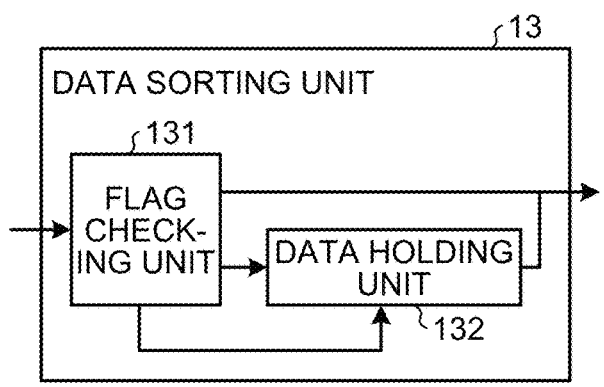
FIG. 4 is a diagram illustrating an example of a configuration of a data sorting unit included in the data processing device according to the first embodiment.

FIG. 4 is a diagram illustrating an example of a configuration of the data sorting unit included in the data processing device according to the first embodiment. The data sorting unit 13 includes a flag checking unit 131 and a data holding unit 132.

The flag checking unit 131 checks the state of the alert flag of data read from an input queue 121, and outputs the data to the outside, that is, stores the data in the output queue 141-1 if the flag is set. If the flag is not set, the flag checking unit 131 outputs the data to the data holding unit 132. Upon receiving data from the flag checking unit 131, the data holding unit 132 holds the data, and upon receiving, from the flag checking unit 131, an instruction to output the data, the data holding unit 132 outputs the held data to the outside, that is, stores the held data in the output queue 141-1. When all of the data are read from one input queue 121 from which data are to be read and the input queue 121 becomes empty, the flag checking unit 131 instructs the data holding unit 132 to output held data.

Figure 5:
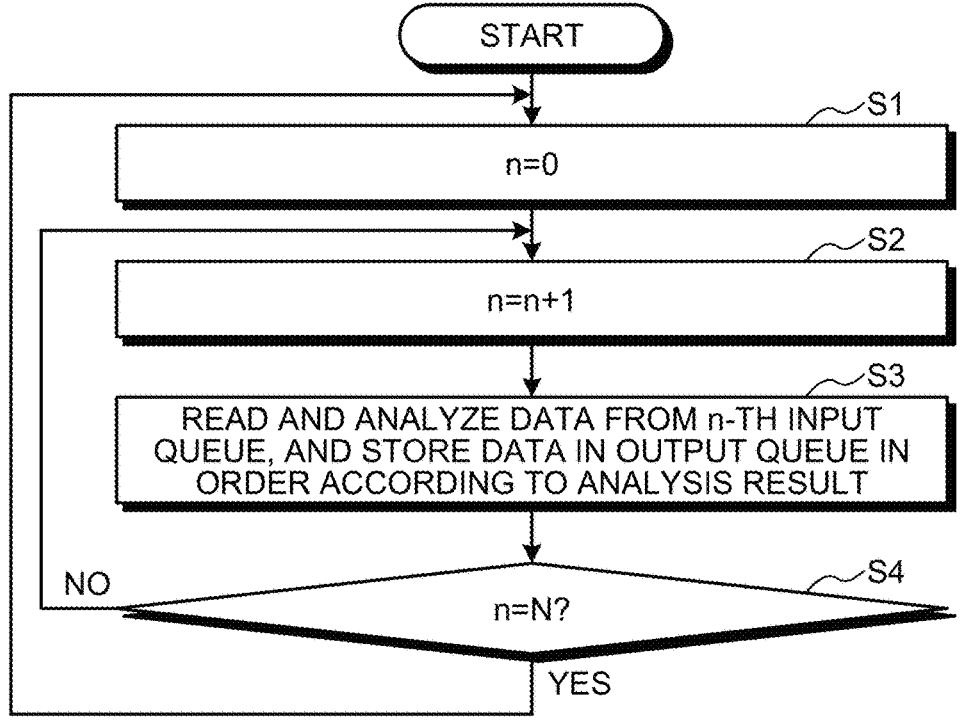
FIG. 5 is a flowchart illustrating an example of operation of the data sorting unit included in the data processing device according to the first embodiment.

FIG. 5 is a flowchart illustrating an example of operation of the data sorting unit included in the data processing device according to the first embodiment.

The data sorting unit 13 first initializes a parameter n to 0 (step S1), and further adds 1 to the parameter n (step S2). Subsequently, the data sorting unit 13 reads and analyzes data from an n-th input queue 121, and stores the data in the output queue 141-1 in order according to the analysis result (step S3). For example, in a case where the input queue 121-1 is the first input queue, the input queue 121-2 is the second input queue, . . . , and the input queue 121-N is the N-th input queue, the data sorting unit 13 reads and analyzes respective data stored in the input queue 121-1 when n=1.

Subsequently, the data sorting unit 13 checks whether or not n=N is satisfied (step S4), and returns to step S2 if n=N is not satisfied (step S4: No) or returns to step S1 if n=N is satisfied (step S4: Yes).

Here, details of the process in step S3 above will be explained with reference to FIG. 6. FIG. 6 is a flowchart illustrating an example of operation of sorting data performed by the data sorting unit of the data processing device according to the first embodiment. FIG. 6 illustrates details of the process in step S3 described above.

Herein, a case of n=1, that is, a case where the data sorting unit 13 reads data from the input queue 121-1, sorts the data, and stores the data in the output queue 141-1 will be explained.

The flag checking unit 131 of the data sorting unit 13 reads first data from the input queue 121-1 (step S11), and checks whether or not an alert flag is present, that is, whether or not the alert flag is set (step S12).

If an alert flag is present (step S12: Yes), the flag checking unit 131 outputs the data to the output queue 141-1 (step S13). If an alert flag is not present (step S12: No), the flag checking unit 131 outputs the data to the data holding unit 132 (step S14).

After performing step S13 or step S14, the flag checking unit 131 checks whether or not data is present in the input queue 121-1 (step S15). If data is present in the input queue 121-1 (step S15: Yes), the flag checking unit 131 returns to step S11. If no data is present in the input queue 121-1 (step S15: No), the flag checking unit 131 instructs the data holding unit 132 to output data, and the data holding unit 132 in receipt of the instruction outputs the held data to the output queue 141-1 (step S16).

In one example, when three data D1, D2, and D3 are stored in this order from the beginning in the input queue 121-1, the data D3 has an alert flag, and the data D1 and D2 have no alert flag, operation illustrated in FIG. 7 is performed. FIG. 7 is a diagram illustrating an example of operation of the data sorting unit included in the data processing device according to the first embodiment. In this case, in the data sorting unit 13, upon reading the data D1 and D2 with no alert flag, the flag checking unit 131 outputs the data D1 and D2 to the data holding unit 132, which in turn holds the data D1 and D2, and upon reading the data D3 with an alert flag, the flag checking unit 131 outputs the data D3 directly to the output queue 141-1. After reading all the data stored in the input queue 121-1, the flag checking unit 131 then instructs the data holding unit 132 to output the data. The data holding unit 132 in receipt of the instruction outputs the held data. As a result, the first data stored in the output queue 141-1 is the data D3 with the alert flag, and the data are output in the order of D3, D1, and D2 from the data processing device 1.

The data outputting unit 15 of the data processing device 1 reads and outputs data stored in the output queue 141-1. In this process, the data outputting unit 15 outputs data with an alert flag being set to the terminal device 3 and outputs data with no alert flag being set to the database 2. This can shorten the time from when high priority data that is data with an alert flag being set is received until when the data is processed, that is, the time required until notification of an alert is provided to users.

While the data processing device 1 is described as performing the processes of analyzing each of data stored in a corresponding one of the input queues 121 to determine whether or not an alert flag is set, and sorting the order of the data, the data processing device 1 may also perform a process of merging data transmitted in a divided state in addition to the aforementioned processes. In this case, the merging process is performed downstream of the output queue 141-1. For example, the data outputting unit 15 performs the merging process.

As described above, upon receiving data, the data processing device according to the present embodiment stores the data into an input queue associated with the gateway that is the transmission source, so that data from the same transmission source are grouped. In addition, the data processing device 1 analyzes data stored in each of the input queues to determine whether or not the data has high priority, that is, whether or not an alert flag is set, sorts the data such that high priority data is to be processed first, and outputs the data. With the data processing device according to the first embodiment, when high priority data is received, the order in which the data is to be processed can be changed, and the time required from when the high priority data is received until when the data is processed can be shortened.

Note that, in the present embodiment, the data sorting unit 13 of the data processing device 1 performs processes on a plurality of input queues 121 (the processes of reading and analyzing data, and sorting and outputting the data) in a predetermined fixed order. For example, the data sorting unit 13 first performs processes on the input queue 121-1, subsequently performs processes on the input queue 121-2 and, in a similar manner, performs processes up to the input queue 121-N, and then returns to the processes on the input queue 121-1 (performs the processes on the input queue 121-1 again), and repeats similar processes. The order in which the data sorting unit 13 performs the processes, however, need not be fixed.

For example, the data sorting unit 13 may first check the number of data stored in each of the input queues 121, and perform processes on each of the input queues 121 in descending order of the number of data stored therein, starting from an input queue 121 storing a larger number of data. In this case, the data sorting unit 13 checks the number of data stored in each of the input queues 121 each time the processes on all of the N input queues 121 are completed, and determines the order in which the processes are to be performed (a first order determination method). When the first order determination method is used, the holding time from when data is stored in each of the input queues 121 until when the data is output therefrom, that is, the processing delay can be reduced on average.

In order opposite to the first order determination method, the data sorting unit 13 may perform processes on each of the input queues 121 in ascending order of the number of data stored therein, starting from an input queue 121 storing a smaller number of data (a second order determination method). When the second order determination method is used, the processing delay time may be increased for data with no alert flag being set (hereinafter referred to as "data with no flag"), but the processing delay time can be reduced for data with an alert flag being set (hereinafter referred to as "data with flag") stored in the input queue 121 processed last. For example, assume a state in which the data processing device includes three input queues A, B, and C, three pieces of data are stored in the input queue A, one piece of data is stored in the input queue B, two pieces of data are stored in the input queue C, and one piece of data with flag is included in the data stored in each of the input queues. In this case, in the operation according to the first order determination method, the data sorting unit 13 reads the data in the order of the input queue A, the input queue C, and the input queue B. Thus, the piece of data with flag stored in the input queue A is first output from the data sorting unit 13 among all the data, the piece of data with flag stored in the input queue C is the fourth piece of data output from the data sorting unit 13 among all the data, and the piece of data with flag stored in the input queue B is the sixth piece of data output from the data sorting unit 13 among all the data. In contrast, in the operation according to the second order determination method, the data sorting unit 13 reads the data in the order of the input queue B, the input queue C, and the input queue A. Thus, the piece of data with flag stored in the input queue B is first output from the data sorting unit 13 among all the data, the piece of data with flag stored in the input queue C is the second piece of data output from the data sorting unit 13 among all the data, and the piece of data with flag stored in the input queue A is the fourth piece of data output from the data sorting unit 13 among all the data. In the operation according to the first order determination method, the third of the three pieces of data with flag (the piece of data with flag stored in the input queue B processed last) is the sixth output piece of data among all the data. In contrast, in the operation according to the second order determination method, the third of the three pieces of data with flag (the piece of data with flag stored in the input queue A processed last) is the fourth output piece of data among all the data, which results in reduction in the processing delay.

Second Embodiment

Figure 8:
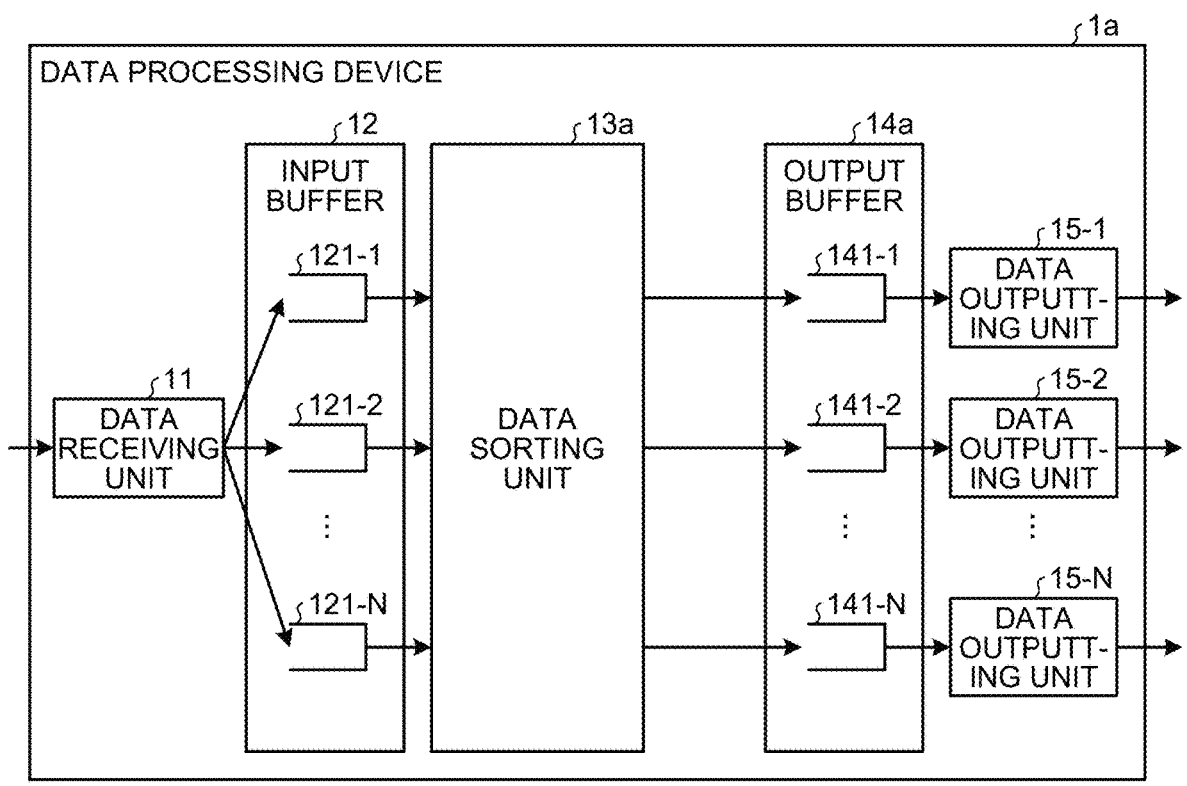
FIG. 8 is a diagram illustrating an example of a configuration of a data processing device according to a second embodiment.

FIG. 8 is a diagram illustrating an example of a configuration of a data processing device according to a second embodiment. Note that the configuration of a data processing system including the data processing device according to the second embodiment is similar to that in the first embodiment.

A data processing device 1a according to the present invention is obtained by replacing the data sorting unit 13, the output buffer 14, and the data outputting unit 15 of the data processing device 1 according to the first embodiment with a data sorting unit 13a, an output buffer 14a, and data outputting units 15-1 to 15-N, respectively. The output buffer 14a includes output queues 141-1 to 141-N. The output queues 141-1 to 141-N and the data outputting units 15-1 to 15-N are associated with the input queues 121-1 to 121-N. Specifically, an output queue 141-n and a data outputting unit 15-n are associated with an input queue 121-n (n=1, 2, . . . , N). Note that, in the description below, the output queues 141-1 to 141-N will be referred to as output queues 141 when the individual output queues 141 need not be distinguished from each other. In a similar manner, the data outputting units 15-1 to 15-N will be referred to as data outputting units 15 when the individual data outputting units 15 need not be distinguished from each other. In addition, in the present embodiment, the configuration and the operation different from those of the data processing device 1 will be described.

In a manner similar to the data sorting unit 13 of the data processing device 1 according to the first embodiment, the data sorting unit 13a sequentially reads and analyzes data stored in each of the plurality of input queues 121 from each of the input queues 121, and outputs the data in order according to the analysis result. Note that the data sorting unit 13a outputs data to an output queue 141 associated with an input queue 121 from which the data is read. Specifically, the data sorting unit 13a outputs data read from the input queue 121-n to the output queue 141-n (n=1, 2, . . . , N). The configuration of the data sorting unit 13a is similar to the configuration of the data sorting unit 13 illustrated in FIG. 4. The data sorting unit 13a, however, outputs data to the output queues 141-1 to 141-N as described above. The flag checking unit 131 of the data sorting unit 13a specifies the output queue to which data is to be output when instructing the data holding unit 132 to output data. The data holding unit 132 of the data sorting unit 13a outputs held data to the output queue specified by the flag checking unit 131.

The data outputting units 15-1 to 15-N read and output data stored in the output queues 141-1 to 141-N, respectively. The operation of each of the data outputting units 15-1 to 15-N is similar to the operation of the data outputting unit 15 of the data processing device 1 according to the first embodiment, in which data with flag is output to the terminal device 3 and data with no flag is output to the database 2. Each data outputting unit 15 reads data from the associated output queue 141.

Because the data processing device 1a having the configuration illustrated in FIG. 8 includes the same number of output queues 141 and data outputting units 15 as the number of input queues 121, the data processing device 1a can further reduce the processing delay time from when data is input into the data processing device 1a until when the data is output therefrom than the data processing device 1 according to the first embodiment. Thus, the data processing device 1a having the configuration illustrated in FIG. 8 can further shorten the time required from when high priority data is received until when the data is processed than the data processing device 1 according to the first embodiment.

Figure 9:
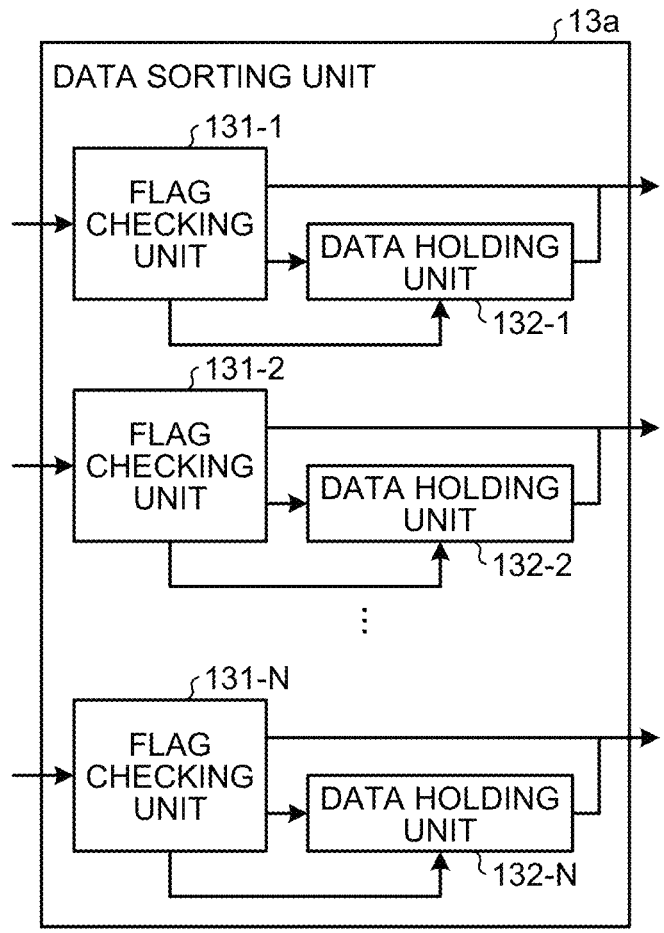
FIG. 9 is a diagram illustrating another example of a configuration of a data sorting unit included in the data processing device according to the second embodiment.

The data sorting unit 13a may have a configuration as illustrated in FIG. 9. FIG. 9 is a diagram illustrating another example of a configuration of the data sorting unit included in the data processing device according to the second embodiment. The data sorting unit 13a illustrated in FIG. 9 includes flag checking units 131-1 to 131-N and data holding units 132-1 to 132-N. The flag checking units 131-1 to 131-N are associated with the input queues 121-1 to 121-N, respectively, and each read data from the associated input queue. Specifically, a flag checking unit 131-n is associated with an input queue 121-n (n=1, 2, . . . , N). Furthermore, the flag checking units 131-1 to 131-N are associated with the output queues 141-1 to 141-N, respectively, and each store data in the associated output queue. Specifically, a flag checking unit 131-n is associated with an output queue 141-n. In addition, a data holding unit 132-n is associated with an output queue 141-n.

The flag checking units 131-1 to 131-N perform operation similar to that of the flag checking unit 131 of the data sorting unit 13 according to the first embodiment. In addition, the data holding units 132-1 to 132-N perform operation similar to that of the data holding unit 132 of the data sorting unit 13 according to the first embodiment. The flag checking units 131-1 to 131-N and the data holding units 132-1 to 132-N, however, perform analysis and sorting on data stored in the associated input queues 121-1 to 121-N, respectively. Specifically, the flag checking units 131-1 to 131-N and the data holding units 132-1 to 132-N repeat the operation according to the flowchart illustrated in FIG. 6 every time a predetermined period elapses. For example, the flag checking unit 131-1 and the data holding unit 132-1 repeat the operation according to the flowchart illustrated in FIG. 6 on data stored in the input queue 121-1 at predetermined periods.

The data sorting unit 13 according to the first embodiment performs the processes on each of the input queues 121-1 to 121-N, that is, the processes of reading, analyzing, and sorting data sequentially on the input queues 121-1 to 121-N. In contrast, the data sorting unit 13a having the configuration illustrated in FIG. 9 performs the processes on the input queues 121-1 to 121-N in parallel at predetermined periods.

As described above, the data processing device 1a including the data sorting unit 13a having the configuration illustrated in FIG. 9 performs in parallel the processes of analyzing data stored in each of the input queues 121 to determine whether or not the data has high priority, that is, whether or not the data is data with flag, which is data with an alert flag being set, and sorting and outputting the data such that the data with flag is to be processed first. This enables the data processing device 1a to further shorten the time required from when high priority data is received until when the data is processed as compared with the case where the processes on data stored in each of the input queues 121 are sequentially performed.

Third Embodiment

While an alert flag is set in advance in each piece of data transmitted from factories in the first and second embodiments, a data processing device analyzes data and sets an alert flag in the present embodiment. The configuration of a data processing system including the data processing device according to the third embodiment is similar to that in the first embodiment. Assume that no alert flags are set in data transmitted from the gateways 5 of the individual factories to the data processing system.

Figure 10:
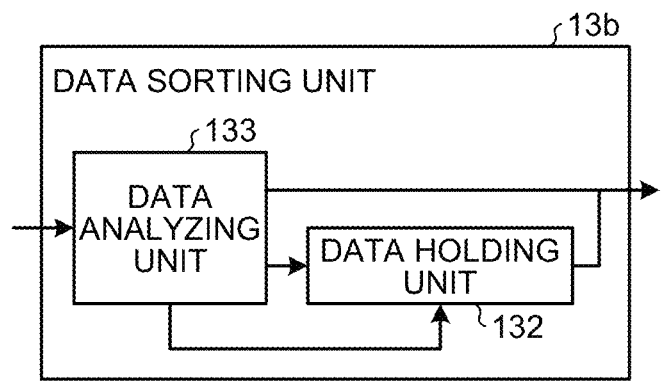
FIG. 10 is a diagram illustrating an example of a configuration of a data sorting unit included in a data processing device according to a third embodiment.

The data processing device according to the present embodiment is obtained by replacing the data sorting unit 13 of the data processing device according to the first embodiment with a data sorting unit 13b illustrated in FIG. 10. Note that FIG. 10 is a diagram illustrating an example of a configuration of the data sorting unit included in the data processing device according to the third embodiment.

The data sorting unit 13b of the data processing device according to the present embodiment includes a data analyzing unit 133 and a data holding unit 132. The data holding unit 132 is the same as the data holding unit 132 of the data sorting unit 13 according to the first embodiment.

The data analyzing unit 133 determines whether or not data read from each input queue 121 has a normal value and, if data has an abnormal value, sets an alert flag in the data and outputs the data to the outside, that is, stores the data in the output queue 141. The data analyzing unit 133, for example, compares read data with a predetermined threshold to determine whether or not the data has an abnormal value. The threshold used for the determination is appropriately changed depending on the conditions such as the type of the data outputting device 6 from which the data is transmitted and the installation position of the data outputting device 6. In addition, if the read data has a normal value, the data analyzing unit 133 outputs the data to the data holding unit 132. When all of the data are read from one input queue 121 from which data are to be read and the input queue 121 becomes empty, the data analyzing unit 133 instructs the data holding unit 132 to output held data.

Figure 11:
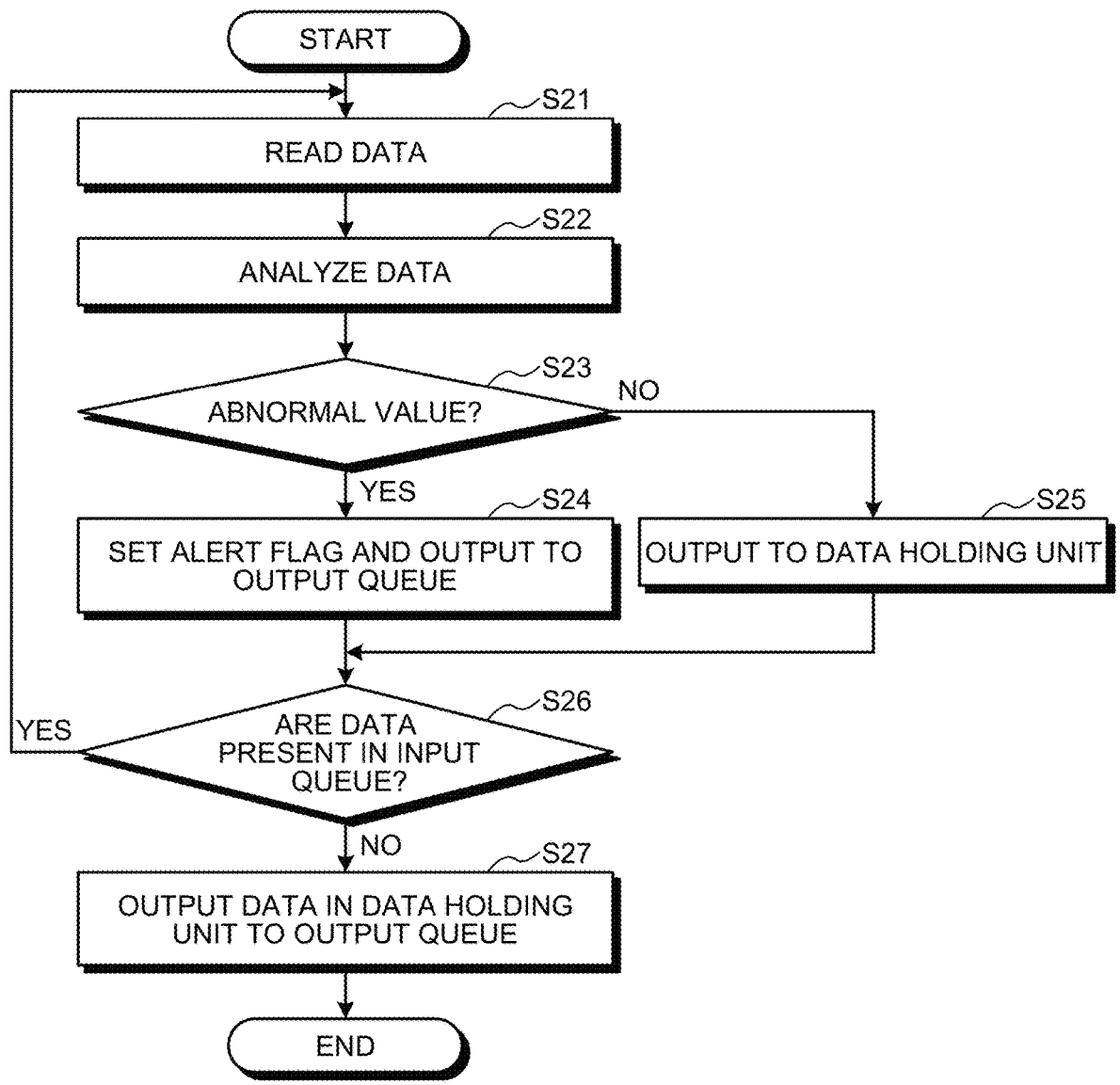
FIG. 11 is a flowchart illustrating an example of operation of sorting data performed by the data sorting unit included in the data processing device according to the third embodiment.

The overall operation of the data sorting unit 13b included in the data processing device according to the present embodiment is according to the flowchart of FIG. 5 referred to in the description for the data processing device according to the first embodiment. The details of the process in step S3, are, however, different. The details of the process in step S3 performed by the data sorting unit 13b included in the data processing device according to the present embodiment are as illustrated in FIG. 11. FIG. 11 is a flowchart illustrating an example of operation of sorting data performed by the data sorting unit included in the data processing device according to the third embodiment.

The details of the operation of sorting data performed by the data sorting unit 13b will be explained with reference to FIG. 11. Herein, a case of n=1, that is, a case where the data sorting unit 13b reads data from the input queue 121-1 and outputs the data will be explained.

The data analyzing unit 133 of the data sorting unit 13b reads first data from the input queue 121-1 (step S21), and analyzes the read data (step S22). Specifically, the data analyzing unit 133 determines whether or not the read data has an abnormal value by comparing the data with a threshold, for example.

If the data has an abnormal value (step S23: Yes), the data analyzing unit 133 sets an alert flag in the read data, and outputs the data to the output queue 141 (step S24). If the data has a normal value (step S23: No), the data analyzing unit 133 outputs the data to the data holding unit 132 (step S25).

After performing step S24 or step S25, the data analyzing unit 133 checks whether or not data is present in the input queue 121-1 (step S26). If data is present in the input queue 121-1 (step S26: Yes), the data analyzing unit 133 returns to step S21. If no data is present in the input queue 121-1 (step S26: No), the data analyzing unit 133 instructs the data holding unit 132 to output data, and the data holding unit 132 in receipt of the instruction outputs the held data to the output queue 141 (step S27).

In the present embodiment, the data processing device that is obtained by replacing the flag checking unit 131 of the data sorting unit 13 (see FIG. 4) of the data processing device 1 according to the first embodiment with the data analyzing unit 133 and that sets alert flags is described. In addition, in a case where the data sorting unit 13a of the data processing device 1a according to the second embodiment has the configuration illustrated in FIG. 9, each of the flag checking units 131-1 to 131-N can be replaced by the data analyzing unit 133 described above.

As described above, in the data processing device according to the present embodiment, the data sorting unit analyzes data stored in each of the input queues to determine whether or not the data has an abnormal value and, if the data has an abnormal value, sorts data such that the data having the abnormal value is to be processed first, and outputs the data. The data processing device according to the present embodiment is capable of determining whether or not received data is high priority data even when data output from a data outputting device that has no functions for setting an alert flag is received, and, in a manner similar to the data processing devices according to the first and second embodiments, the processing order is changed when high priority data is received; therefore, it is possible to shorten the time required from when the high priority data is received until when the data is processed.

Fourth Embodiment

Figure 12:
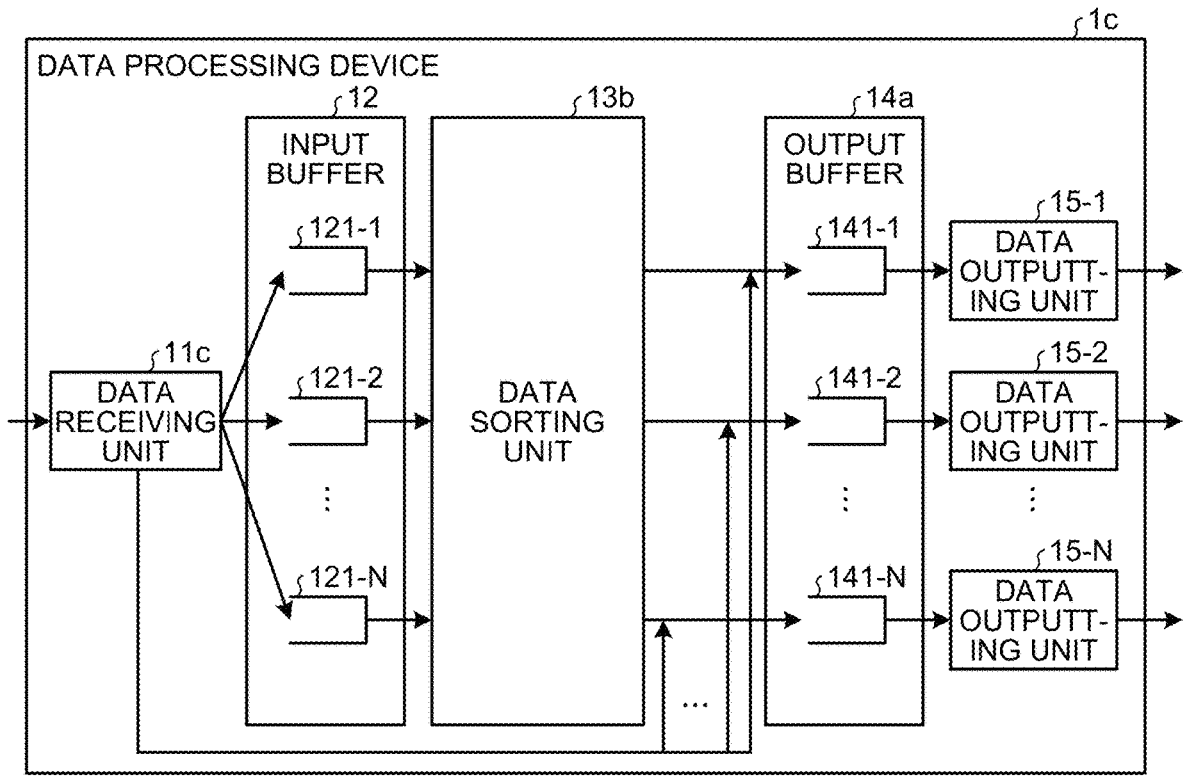
FIG. 12 is a diagram illustrating an example of a configuration of a data processing device according to a fourth embodiment.

FIG. 12 is a diagram illustrating an example of a configuration of a data processing device according to a fourth embodiment. Note that the configuration of a data processing system including the data processing device according to the fourth embodiment is similar to that in the first embodiment. In the present embodiment, assume that alert flags are set in data transmitted from gateways 5 of the individual factories to the data processing system in a manner similar to the first and second embodiments.

A data processing device 1c according to the present embodiment is obtained by replacing the data receiving unit 11 and the data sorting unit 13a of the data processing device 1a according to the second embodiment with a data receiving unit 11c and a data sorting unit 13b, respectively.

The data receiving unit 11c analyzes data received from the gateways 5 of the individual factories, and stores the received data in the input buffer 12 or the output buffer 14a on the basis of the analysis result. Specifically, the data receiving unit 11c stores the received data in the input queue 121 associated with the gateway 5 from which the data is transmitted when no alert flag is set in the received data, or stores the received data in the output queue 141 associated with the gateway 5 from which the data is transmitted when an alert flag is set in the received data.

Figure 13:
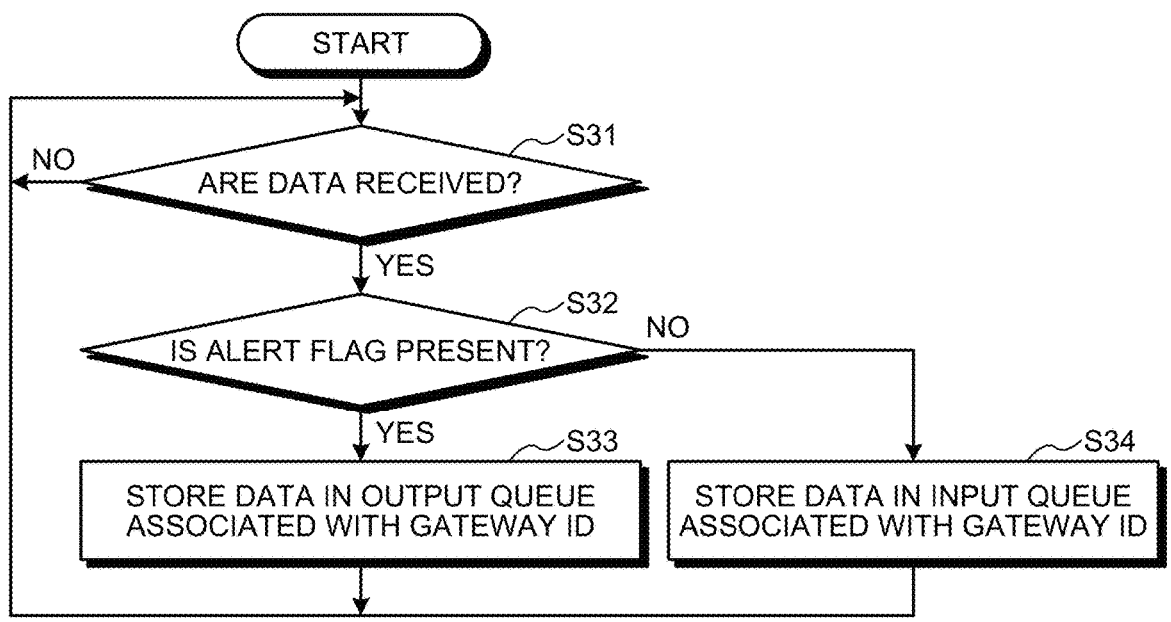
FIG. 13 is a flowchart illustrating an example of operation of a data receiving unit included in the data processing device according to the fourth embodiment.

FIG. 13 is a flowchart illustrating an example of operation of the data receiving unit included in the data processing device according to the fourth embodiment.

Upon starting to operate, the data receiving unit 11c checks whether or not data is received (step S31), and repeats the process in step S31 if no data is received (step S31: No). If data is received (step S31: Yes), the data receiving unit 11c checks whether or not an alert flag is present in the received data, that is, whether or not the received data is data with flag (step S32). If the received data is data with flag (step S32: Yes), the data receiving unit 11c stores the data in the output queue 141 associated with the gateway ID included in the data (step S33). If the received data is data with no flag (step S32: No), the data receiving unit 11c stores the data in the input queue 121 associated with the gateway ID included in the data (step S34).

The data sorting unit 13b is the same as the data sorting unit 13b described in the third embodiment (see FIGS. 10 and 11). Specifically, the data sorting unit 13b analyzes data read from each of the input queues 121 to determine whether or not the data has an abnormal value, sorts data such that data having an abnormal value is to be output prior to data having a normal value, and store the data in the output queue 141.

As described above, in the data processing device 1c according to the present embodiment, when received data is data with flag, which is high priority data, the data receiving unit 11c stores the data in the output queue 141 instead of the input queue. Thus, the data processing device 1c can further shorten the time required from when high priority data is received until when the data is processed as compared with the data processing devices according to the first to third embodiments that determine whether or not received data is high priority data after storing the data in an input queue.

In addition, in the data processing device according to the present embodiment, the data sorting unit analyzes data to determine whether or not the data has an abnormal value, sorts data such that abnormal values are to be processed prior to normal values, and stores the data in the output queues. This enables the data processing device to determine whether or not received data is high priority data even when data output from a data outputting device that has no functions for setting an alert flag is received; therefore, it is possible to shorten the time required from when the high priority data is received until when the data is processed.

Fifth Embodiment

Next, a data processing device according to a fifth embodiment will be described. The configuration of a data processing system including the data processing device according to the fifth embodiment is similar to that in the first embodiment. While an alert flag is set in advance in data transmitted from factories in the first and second embodiments, etc., data transmitted from factories include information indicating the type of data in addition to the alert flag in the present embodiment.

Figure 14:
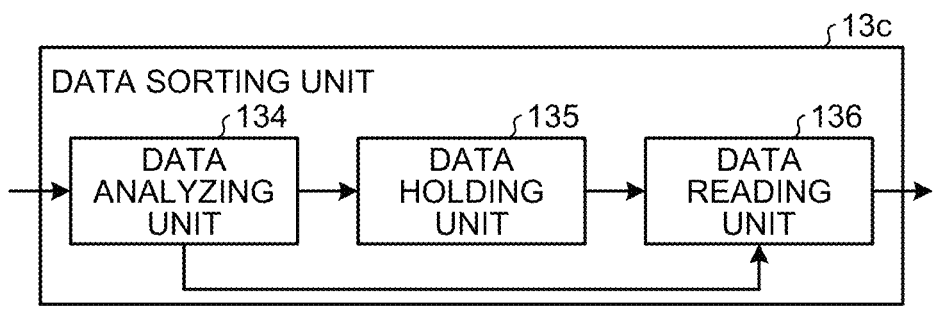
FIG. 14 is a diagram illustrating an example of a configuration of a data sorting unit included in a data processing device according to a fifth embodiment.
Figure 15:
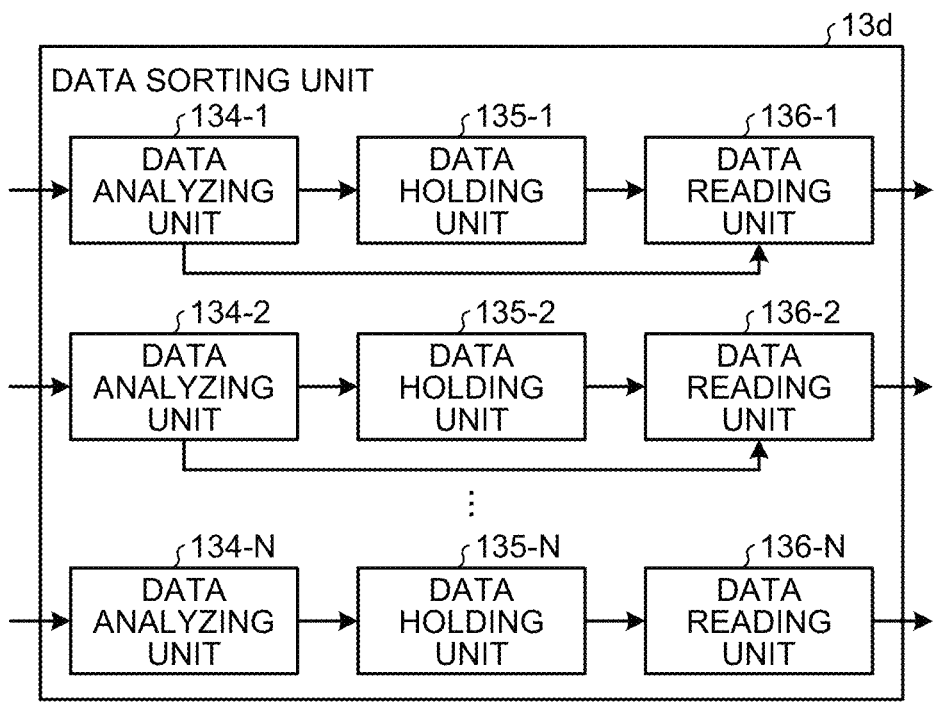
FIG. 15 is a diagram illustrating another example of a configuration of a data sorting unit included in the data processing device according to the fifth embodiment.

The data processing device according to the present embodiment is obtained by replacing the data sorting unit 13b of the data processing device 1c according to the fourth embodiment illustrated in FIG. 12 with a data sorting unit 13c illustrated in FIG. 14 or a data sorting unit 13d illustrated in FIG. 15. Note that FIG. 14 is a diagram illustrating an example of a configuration of the data sorting unit included in the data processing device according to the fifth embodiment, and FIG. 15 is a diagram illustrating another example of a configuration of the data sorting unit included in the data processing device according to the fifth embodiment.

As illustrated in FIG. 14, the data sorting unit 13c includes a data analyzing unit 134, a data holding unit 135, and a data reading unit 136. In a manner similar to the data sorting unit 13 described in the first embodiment, the data sorting unit 13c sequentially reads and analyzes data stored in each of the plurality of input queues 121 from each of the input queues 121, and outputs the data in order according to the analysis result to the output queue 141. Note that the data sorting unit 13c outputs data to an output queue associated with a gateway 5 from which the data is transmitted.

The data analyzing unit 134 of the data sorting unit 13c analyzes data, assigns a priority level based on the analysis result to the data, and outputs the data. The data holding unit 135 holds data input from the data analyzing unit 134. The data reading unit 136 reads and outputs data held in the data holding unit 135 in descending order of the priority level.

In addition, as illustrated in FIG. 15, the data sorting unit 13d includes data analyzing units 134-1 to 134-N, data holding units 135-1 to 135-N, and data reading units 136-1 to 136-N. The data analyzing units 134-1 to 134-N are similar to the data analyzing unit 134 of the data sorting unit 13c. The data holding units 135-1 to 135-N are similar to the data holding unit 135 of the data sorting unit 13c. The data reading units 136-1 to 136-N are similar to the data reading unit 136 of the data sorting unit 13c. In addition, a data analyzing unit 134-n, a data holding unit 135-n, and a data reading unit 136-n perform a sorting process on data stored in an input queue 121-n, and store the sorted data in an output queue 141-n (n=1, 2, . . . , N).

FIG. 16 is a flowchart illustrating an example of operation of sorting data performed by the data sorting unit of the data processing device according to the fifth embodiment.

Herein, a case where the data sorting unit 13c illustrated in FIG. 14 reads data from the input queue 121-1, sorts the data, and stores the data in the output queue 141-1 will be explained.

The data analyzing unit 134 of the data sorting unit 13c reads first data from the input queue 121-1 (step S41), and analyzes the read data (step S42). In step S42, the data analyzing unit 134 checks the type of the data. Subsequently, the data analyzing unit 134 assigns a priority level to the data, and outputs the data to the data holding unit 135, which in turn holds the data to which the priority level is assigned (step S43). The data analyzing unit 134 holds a table indicating the correspondence relation between the type and the priority level of data, determines the priority level by referring to the table, and assigns the priority level to data, for example. In this case, the data analyzing unit 134 holds such a table as illustrated in FIG. 17. FIG. 17 is a diagram illustrating an example of a configuration of a table used by the data sorting unit of the data processing device according to the fifth embodiment. Note that, in the table illustrated in FIG. 17, the priority level is higher as the numerical value is smaller. In a case of assigning a priority level to data by referring to the table having the configuration illustrated in FIG. 17, the data analyzing unit 134 assigns a priority level "1" to data indicating failure, a priority level "2" to data indicating error, a priority level "3" to data indicating warning, and a priority level "4" to data indicating a measured value.

Subsequently, the data analyzing unit 134 checks whether or not data is present in the input queue 121-1 (step S44), and if data is present in the input queue 121-1 (step S44: Yes), returns to step S41. If no data is present in the input queue 121-1 (step S44: No), the data analyzing unit 134 instructs the data reading unit 136 to read and output data from the data holding unit 135. The data reading unit 136 in receipt of the instruction outputs the data held in the data holding unit 135 to the output queue 141-1 in order according to the priority levels (step S45). Specifically, the data reading unit 136 reads the data held in the data holding unit 135 in descending order of the priority level, and stores the data in the output queue 141-1.

While the case where the data sorting unit 13c reads and sorts data from the input queue 121-1 and stores the sorted data in the output queue 141-1 is described herein, the processes in the cases where the data sorting unit 13c reads data from the other input queues 121 are similar. In addition, the operation of the data sorting unit 13d to read and sort data from each of the input queues 121 and store the data in each of the output queues 141 is similar. Note that the data sorting unit 13d performs the operations according to the flowchart illustrated in FIG. 16 in parallel.

As described above, in the data processing device according to the present embodiment, the data sorting unit analyzes data stored in each of the input queues, and sorts and outputs the data such that data are to be processed in descending order of the priority level that depends on the data type. The data processing device according to the present embodiment can make the processing delay time of data with flag equivalent to the case where the data processing device according to the fourth embodiment is applied, and can further make the time required from when data with no flag is received until when the data is processed shorter as the priority level of the type of the data is higher.

Sixth Embodiment

Figure 18:
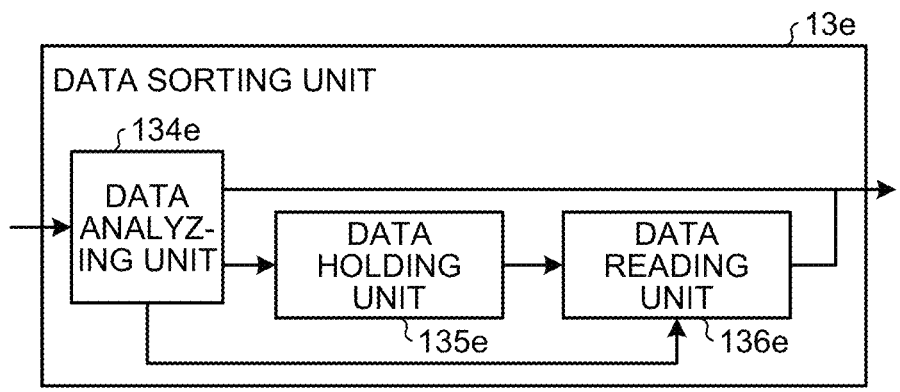
FIG. 18 is a diagram illustrating an example of a configuration of a data sorting unit included in a data processing device according to a sixth embodiment.
Figure 19:
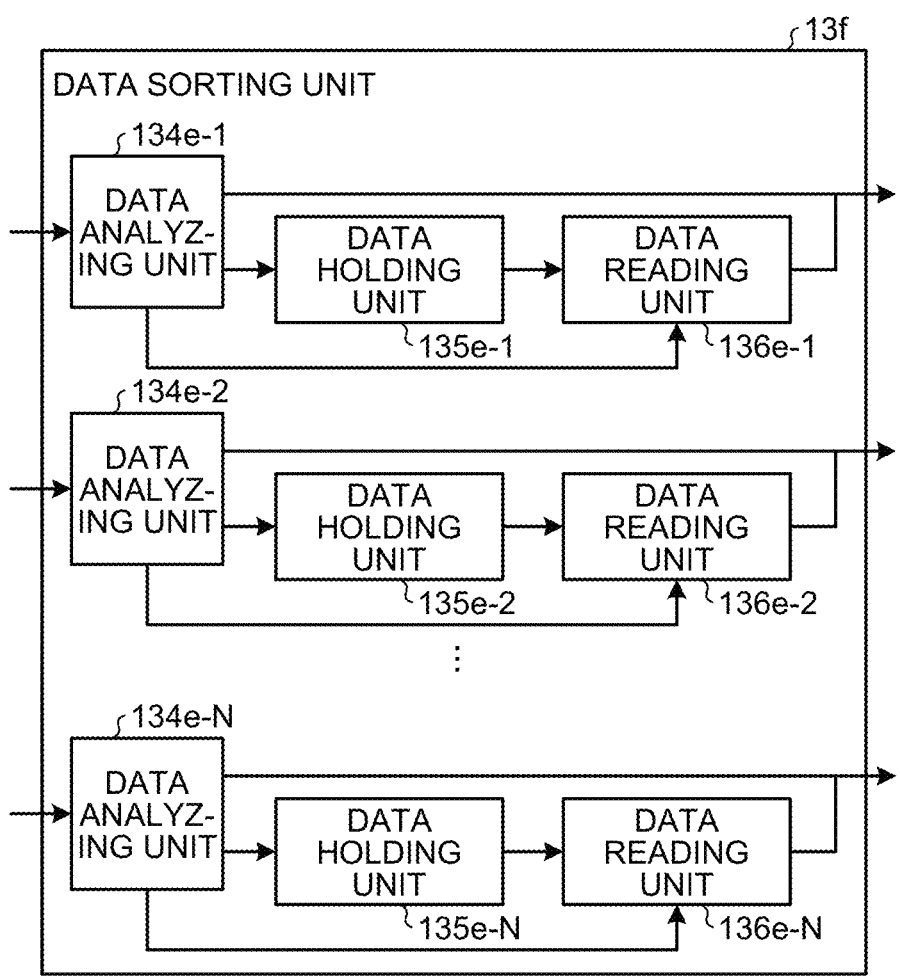
FIG. 19 is a diagram illustrating another example of a configuration of a data sorting unit included in the data processing device according to the sixth embodiment.

While the case where the data sorting unit 13b of the data processing device 1c according to the fourth embodiment is replaced by the data sorting unit 13c illustrated in FIG. 14 or the data sorting unit 13d illustrated in FIG. 15 is described in the fifth embodiment, the data sorting unit 13a of the data processing device 1a according to the second embodiment may be replaced by a data sorting unit 13e illustrated in FIG. 18 or a data sorting unit 13f illustrated in FIG. 19. FIG. 18 is a diagram illustrating an example of a configuration of the data sorting unit included in the data processing device according to the sixth embodiment, and FIG. 19 is a diagram illustrating another example of a configuration of the data sorting unit included in the data processing device according to the sixth embodiment.

As illustrated in FIG. 18, the data sorting unit 13e includes a data analyzing unit 134e, a data holding unit 135e, and a data reading unit 136e. In a manner similar to the data sorting unit 13 described in the first embodiment, the data sorting unit 13e sequentially reads and analyzes data stored in each of the plurality of input queues 121 from each of the input queues 121, and outputs the data in order according to the analysis result to the output queue 141. Note that the data sorting unit 13e outputs data to an output queue associated with a gateway 5 from which the data is transmitted.

The data analyzing unit 134e of the data sorting unit 13e checks whether or not data is data with flag, and outputs the data to the output queue 141 if the data is data with flag, or further checks the type of the data, assigns a priority level based on the data type to the data, and outputs the data to the data holding unit 135e if the data is data with no flag. The data holding unit 135e holds data input from the data analyzing unit 134e. The data reading unit 136e reads and outputs data held in the data holding unit 135e in descending order of the priority level.

In addition, as illustrated in FIG. 19, the data sorting unit 13f includes data analyzing units 134e-1 to 134e-N, data holding units 135e-1 to 135e-N, and data reading units 136e-1 to 136e-N. The data analyzing units 134e-1 to 134e-N are similar to the data analyzing unit 134e of the data sorting unit 13e. The data holding units 135e-1 to 135e-N are similar to the data holding unit 135e of the data sorting unit 13e. The data reading units 136e-1 to 136e-N are similar to the data reading unit 136e of the data sorting unit 13e. In addition, a data analyzing unit 134e-n, a data holding unit 135e-n, and a data reading unit 136e-n perform a sorting process on data stored in an input queue 121-n, and store the sorted data in an output queue 141-n (n=1, 2, . . . , N).

Figure 20:
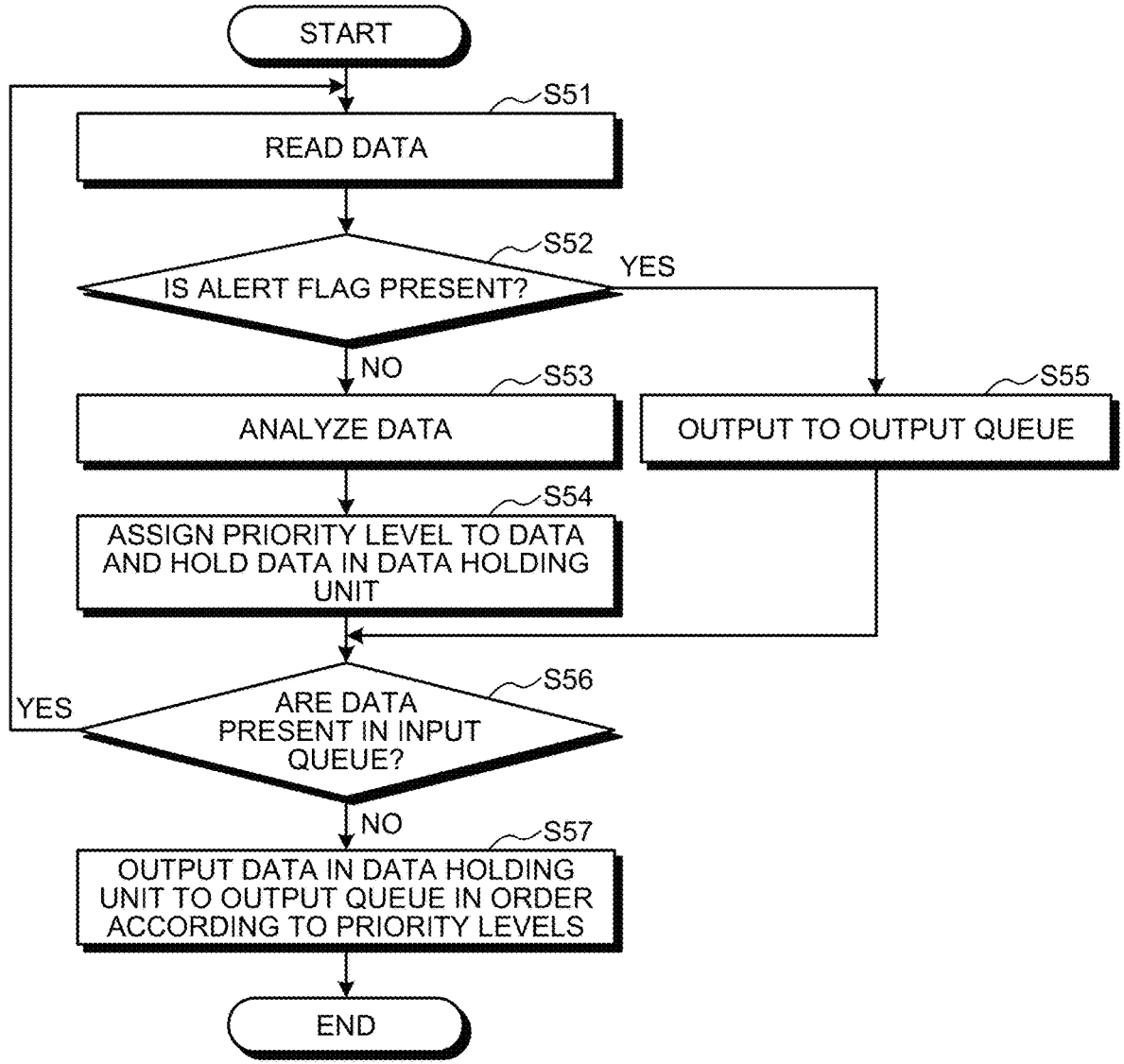
FIG. 20 is a flowchart illustrating an example of operation of sorting data performed by the data sorting unit of the data processing device according to the sixth embodiment.

FIG. 20 is a flowchart illustrating an example of operation of sorting data performed by the data sorting unit of the data processing device according to the sixth embodiment.

Herein, a case where the data sorting unit 13e illustrated in FIG. 18 reads data from the input queue 121-1, sorts the data, and stores the data in the output queue 141-1 will be explained.

The data analyzing unit 134e of the data sorting unit 13e reads first data from the input queue 121-1 (step S51), and checks whether or not an alert flag is present, that is, whether or not the data is data with flag (step S52). If the data is data with flag (step S52: Yes), the data analyzing unit 134e outputs the data to the output queue 141-1 (step S55). If the data is not data with flag, that is, if the data is data with no flag (step S52: No), the data analyzing unit 134e analyzes the data (step S53). In step S53, the data analyzing unit 134e checks the type of the data. Subsequently, the data analyzing unit 134e assigns a priority level to the data, and outputs the data to the data holding unit 135e, which in turn holds the data to which the priority level is assigned (step S54). The data analyzing unit 134e determines the priority level and assigns the priority level to the data in a manner similar to that of the data analyzing unit 134 described in the fifth embodiment.

Subsequently, the data analyzing unit 134e checks whether or not data is present in the input queue 121-1 (step S56), and if data is present in the input queue 121-1 (step S56: Yes), returns to step S51. If no data is present in the input queue 121-1 (step S56: No), the data analyzing unit 134e instructs the data reading unit 136e to read and output data from the data holding unit 135e. The data reading unit 136e in receipt of the instruction outputs the data held in the data holding unit 135e to the output queue 141-1 in order according to the priority levels (step S57). Specifically, the data reading unit 136e reads the data held in the data holding unit 135e in descending order of the priority level, and stores the data in the output queue 141-1.

While the case where the data sorting unit 13e reads and sorts data from the input queue 121-1 and stores the sorted data in the output queue 141-1 is described herein, the processes in the cases where the data sorting unit 13e reads data from the other input queues 121 are similar. In addition, the operation of the data sorting unit 13f to read and sort data from each of the input queues 121 and store the data in each of the output queues 141 is similar. Note that the data sorting unit 13f performs the operations according to the flowchart illustrated in FIG. 20 in parallel.

As described above, in the data processing device according to the present embodiment, the data sorting unit analyzes data stored in each of the input queues, sorts the data such that data with flag are to be processed prior to data with no flag and that data with no flag are processed in descending order of the priority level that depends on the type of the data, and outputs the sorted data. The data processing device according to the present embodiment can shorten the time required from when data with flag is received until when the data is processed, and can further make the time required from when data with no flag is received until when the data is processed shorter as the priority level of the type of the data is higher.

While the case where the data sorting unit 13a of the data processing device 1a according to the second embodiment is replaced by the data sorting unit 13e illustrated in FIG. 18 or the data sorting unit 13f illustrated in FIG. 19 is described in the present embodiment, the data sorting unit 13 of the data processing device 1 according to the first embodiment may be replaced by the data sorting unit 13e illustrated in FIG. 18.

Figure 21:
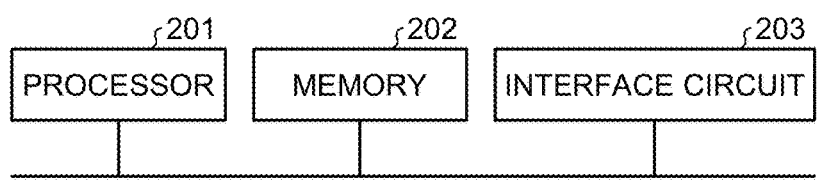
FIG. 21 is a diagram illustrating an example of a configuration of hardware for implementing the data processing device according to the embodiments.

Next, a configuration of hardware for implementing the data processing device described in the embodiments will be described. FIG. 21 is a diagram illustrating an example of a configuration of hardware for implementing the data processing device according to the embodiments.

The data processing device 1 can be implemented by hardware including a processor 201, a memory 202, and an interface circuit 203 illustrated in FIG. 21. The processor 201 is a central processing unit (CPU; also referred to as a central processing device, a processing device, a computing device, a microprocessor, a microcomputer, or a digital signal processor (DSP)), a system large scale integration (LSI), or the like. In addition, the memory 202 is a random access memory (RAM), a read only memory (ROM), a flash memory, an erasable programmable ROM (EPROM), an electrically erasable programmable ROM (EEPROM; registered trademark) or the like. The hardware implementing the data processing device 1 may have a configuration further including a display device, an input device, a communication device, and the like.

For example, in the case of the data processing device 1 according to the first embodiment, the data receiving unit 11 and the data outputting unit 15 are implemented by the interface circuit 203. In addition, the input buffer 12 and the output buffer 14 are implemented by the memory 202. The data sorting unit 13 is implemented by the processor 201 by reading and executing programs for operating as the data sorting unit 13 from the memory 202. While the case for implementing the data processing device 1 according to the first embodiment has been described, the same is applicable to the data processing devices according to the other embodiments.

While the data processing device installed in the cloud sorts data such that high priority data is to be processed prior to other data in the embodiments, the sorting of data can be performed by a device in a factory. Specifically, the processes of reading data from one input queue, analyzing the data, and sorting the data performed by the data sorting unit of the data processing device described in each of the embodiments may be performed upstream of the gateway 5 in each factory.

In addition, while the data processing devices that analyze and sort data obtained at production sites, that is, data output from data outputting devices installed in factories are described in the embodiments, data handled by the data processing device are not limited to data obtained at production sites. The data processing devices described in the embodiments are applicable to systems having a configuration in which data output from equipment in a plurality of sites are obtained via a gateway installed in each of the sites. Examples of the sites include stores of products, and branch offices or sales offices of companies.

The configurations presented in the embodiments above are examples of the present invention, and can be combined with other known technologies or can be partly omitted or modified without departing from the scope of the present invention.

REFERENCE SIGNS LIST 1, 1a, 1c data processing device; 2 database; 3 terminal device; 4 application; 5 gateway; 6 data outputting device; 7 network; 11, 11c data receiving unit; 12 input buffer; 13, 13a, 13b, 13c, 13d, 13e, 13f data sorting unit; 14, 14a output buffer; 15, 15-1 to 15-N data outputting unit; 100 data processing system; 121-1 to 121-N input queue; 131, 131-1 to 131-N flag checking unit; 132, 132-1 to 132-N, 135, 135-1 to 135-N, 135e, 135e-1 to 135e-N data holding unit; 133, 134, 134-1 to 134-N, 134e, 134e-1 to 134e-N data analyzing unit; 136, 136-1 to 136-N, 136e, 136e-1 to 136e-N data reading unit; and 141-1 to 141-N output queue.

The invention claimed is:

1. A data processing device comprising:
a data receiver to receive data;
a plurality of input queues associated one-to-one with transmission sources of data received by the data receiver, the input queues each storing the data from the associated transmission source; and
a data sorter to read data stored in each of the plurality of input queues from each of the input queues, and store the data in an output queue such that higher priority data is processed first, wherein
the data sorter includes:
a flag checker to check whether or not an alert flag indicating the higher priority data is set on the data; and
a data storage to temporarily hold data with no alert flag being set, and
the flag checker outputs data with the alert flag being set to the output queue, outputs data with no alert flag being set to the data storage, and, after reading all data stored in one input queue, instructs the data storage to output held data to the output queue.

2. The data processing device according to claim 1, wherein the data sorter performs a process of reading data from one input queue, sorting the data, and outputting the data to the output queue by the flag checker and the data storage in ascending order of the number of data stored in the input queues, starting from an input queue storing a smaller number of data.

3. The data processing device according to claim 2, wherein the data sorter performs a process of reading data from one input queue, sorting the data, and outputting the data to the output queue by the flag checker and the data storage in descending order of the number of data stored in the input queues, starting from an input queue storing a larger number of data.

4. The data processing device according to claim 1, wherein
the output queue includes a plurality of output queues associated one-to-one with the plurality of input queues, the output queues each storing data read from the associated input queue by the data sorter, and
the data processing device comprises a plurality of data transmitters associated one-to-one with the plurality of output queues, the data transmitters each reading and outputting data from the associated output queue.

5. The data processing device according to claim 4, wherein
upon receiving data, the data receiver checks whether or not an alert flag indicating the higher priority data is set on the received data, stores data with the alert flag being set in the output queue, and stores data with no alert flag being set in the input queue.

6. A data processing device comprising:
a data receiver to receive data;
a plurality of input queues associated one-to-one with transmission sources of data received by the data receiver, the input queues each storing the data from the associated transmission source; and
a data sorter to read data stored in each of the plurality of input queues from each of the input queues, and store the data in an output queue such that higher priority data is processed first, wherein
the data sorter includes:
a plurality of flag checkers associated one-to-one with the plurality of input queues, the flag checkers each checking whether or not an alert flag indicating the higher priority data is set on data stored in the associated input queue; and a plurality of data storages associated one-to-one with the plurality of flag checkers, the data storages each receiving data with no alert flag being set from the associated flag checker and temporality storing the received data, the flag checkers each read data from the associated input queue, output data with the alert flag being set to the output queue, outputs data with no alert flag being set to the associated data storage, and, after reading all data stored in the associated input queue, instructs the associated data storage to output held data to the output queue.

7. The data processing device according to claim 6, wherein the output queue includes a plurality of output queues associated one-to-one with the plurality of input queues, the output queues each storing data read from the associated input queue by the data sorter, and the data processing device comprises a plurality of data transmitters associated one-to-one with the plurality of output queues, the data transmitters each reading and outputting data from the associated output queue.

8. The data processing device according to claim 7, wherein upon receiving data, the data receiver checks whether or not an alert flag indicating the higher priority data is set on the received data, stores data with the alert flag being set in the output queue, and stores data with no alert flag being set in the input queue.

9. A data processing device comprising:
a data receiver to receive data;
a plurality of input queues associated one-to-one with transmission sources of data received by the data receiver, the input queues each storing the data from the associated transmission source; and
a data sorter to read data stored in each of the plurality of input queues from each of the input queues, and store the data in an output queue such that higher priority data is processed first, wherein the data sorter includes:
a data analyzer to analyze data to determine whether or not the data corresponds to the higher priority data; and
a data storage to temporarily hold data not corresponding to the higher priority data, and
the data analyzer sets an alert flag indicating the higher priority data on the higher priority data, outputs the higher priority data to the output queue, outputs data not corresponding to the higher priority data to the data storage, and, after reading all data stored in one input queue, instructs the data storage to output held data to the output queue.

10. The data processing device according to claim 9, wherein the data sorter performs a process of reading data from one input queue, sorting the data, and outputting the data to the output queue by the data analyzer and the data storage in ascending order of the number of data stored in the input queues, starting from an input queue storing a smaller number of data.

11. The data processing device according to claim 9, wherein the data sorter performs a process of reading data from one input queue, sorting the data, and outputting the data to the output queue by the data analyzer and the data storage in descending order of the number of data stored in the input queues, starting from an input queue storing a larger number of data.

12. The data processing device according to claim 9, wherein the output queue includes a plurality of output queues associated one-to-one with the plurality of input queues, the output queues each storing data read from the associated input queue by the data sorter, and the data processing device comprises a plurality of data transmitters associated one-to-one with the plurality of output queues, the data transmitters each reading and outputting data from the associated output queue.

13. The data processing device according to claim 12, wherein upon receiving data, the data receiver checks whether or not an alert flag indicating the higher priority data is set on the received data, stores data with the alert flag being set in the output queue, and stores data with no alert flag being set in the input queue.

14. A data processing device comprising:
a data receiver to receive data;
a plurality of input queues associated one-to-one with transmission sources of data received by the data receiver, the input queues each storing the data from the associated transmission source; and
a data sorter to read data stored in each of the plurality of input queues from each of the input queues, and store the data in an output queue such that higher priority data is processed first, wherein the data sorter includes:
a plurality of data analyzers associated one-to-one with the plurality of input queues, the data analyzers each analyzing data stored in the associated input queue to determine whether or not the data corresponds to the higher priority data; and
a plurality of data storages associated one-to-one with the plurality of data analyzers, the data storages each receiving data not corresponding to higher priority data from the associated data analyzer and temporarily storing the data, and
the data analyzers each set an alert flag indicating the higher priority data on the higher priority data, outputs the higher priority data to the output queue, outputs data not corresponding to the higher priority data to the associated data storage, and, after reading all data stored in the associated input queue, instructs the associated data storage to output held data to the output queue.

15. The data processing device according to claim 14, wherein the output queue includes a plurality of output queues associated one-to-one with the plurality of input queues, the output queues each storing data read from the associated input queue by the data sorter, and the data processing device comprises a plurality of data transmitters associated one-to-one with the plurality of output queues, the data transmitters each reading and outputting data from the associated output queue.

16. The data processing device according to claim 15, wherein upon receiving data, the data receiver checks whether or not an alert flag indicating the higher priority data is set on the received data, stores data with the alert flag being set in the output queue, and stores data with no alert flag being set in the input queue.

17. A data processing device comprising:
a data receiver to receive data; a plurality of input queues associated one-to-one with transmission sources of data received by the data receiver, the input queues each storing the data from the associated transmission source; and a data sorter to read data stored in each of the plurality of input queues from each of the input queues, and store the data in an output queue such that higher priority data is processed first, wherein the data sorter includes:

a data analyzer to analyze data to determine a priority level, and assign the determined priority level to the analyzed data;

a data storage to receive the data to which the priority level is assigned from the data analyzer and temporarily hold the data; and a data reader to read data held in the data storage in order according to the assigned priority level and output the read data to the output queue, and after reading all data stored in one input queue, the data analyzer instructs the data reader to read data from the data storage.

18. The data processing device according to claim 17, wherein the data sorter performs a process of reading data from one input queue, sorting the data, and outputting the data to the output queue by the data analyzer, the data storage, and the data reader in ascending order of the number of data stored in the input queues, starting from an input queue storing a smaller number of data.

19. The data processing device according to claim 17, wherein the data sorter performs a process of reading data from one input queue, sorting the data, and outputting the data to the output queue by the data analyzer, the data storage, and the data reader in descending order of the number of data stored in the input queues, starting from an input queue storing a larger number of data.

20. The data processing device according to claim 17, wherein the output queue includes a plurality of output queues associated one-to-one with the plurality of input queues, the output queues each storing data read from the associated input queue by the data sorter, and the data processing device comprises a plurality of data transmitters associated one-to-one with the plurality of output queues, the data transmitters each reading and outputting data from the associated output queue.

21. The data processing device according to claim 20, wherein upon receiving data, the data receiver checks whether or not an alert flag indicating the higher priority data is set on the received data, stores data with the alert flag being set in the output queue, and stores data with no alert flag being set in the input queue.

22. A data processing device comprising:

a data receiver to receive data;

a plurality of input queues associated one-to-one with transmission sources of data received by the data receiver, the input queues each storing the data from the associated transmission source; and a data sorter to read data stored in each of the plurality of input queues from each of the input queues, and store the data in an output queue such that higher priority data is processed first, wherein the data sorter includes:

a plurality of data analyzers associated one-to-one with the plurality of input queues, the data analyzers each analyzing data stored in the associated input queue to determine a priority level and assigning the determined priority level to the analyzed data;

a plurality of data storages associated one-to-one with the plurality of data analyzers, the data storages each receiving data to which the priority level is assigned from the associated data analyzer and temporarily holding the received data; and a plurality of data readers associated one-to-one with the plurality of data storages, the data readers each reading data held in the associated data storage in order according to the assigned priority level, and outputting the read data to the output queue, and after reading all data stored in the associated input queue, the plurality of data analyzers each instruct the associated data reader to read data from the associated data storage.

23. The data processing device according to claim 22, wherein the output queue includes a plurality of output queues associated one-to-one with the plurality of input queues, the output queues each storing data read from the associated input queue by the data sorter, and the data processing device comprises a plurality of data transmitters associated one-to-one with the plurality of output queues, the data transmitters each reading and outputting data from the associated output queue.

24. The data processing device according to claim 23, wherein upon receiving data, the data receiver checks whether or not an alert flag indicating the higher priority data is set on the received data, stores data with the alert flag being set in the output queue, and stores data with no alert flag being set in the input queue.

25. A data processing device comprising:

a data receiver to receive data;

a plurality of input queues associated one-to-one with transmission sources of data received by the data receiver, the input queues each storing the data from the associated transmission source; and a data sorter to read data stored in each of the plurality of input queues from each of the input queues, and store the data in an output queue such that higher priority data is processed first, wherein the data sorter includes:

a data analyzer to check whether or not an alert flag indicating the higher priority data is set on the data, output the data to the output queue when the alert flag is set, or analyze the data to determine a priority level and assign the determined priority level to the analyzed data when no alert flag is set;

a data storage to receive the data to which the priority level is assigned from the data analyzer, and temporarily hold the received data; and a data reader to read data held in the data storage in order according to the assigned priority level, and output the read data to the output queue, and after reading all data stored in one input queue, the data analyzer instructs the data reader to read data from the data storage.

26. The data processing device according to claim 25, wherein the data sorter performs a process of reading data from one input queue, sorting the data, and outputting the data to the output queue by the data analyzer, the data storage, and the data reader in ascending order of the number of data stored in the input queues, starting from an input queue storing a smaller number of data.

27. The data processing device according to claim 25, wherein the data sorter performs a process of reading data from one input queue, sorting the data, and outputting the data to the output queue by the data analyzer, the data storage, and the data reader in descending order of the number of data stored in the input queues, starting from an input queue storing a larger number of data.

28. The data processing device according to claim 25, wherein the output queue includes a plurality of output queues associated one-to-one with the plurality of input queues, the output queues each storing data read from the associated input queue by the data sorter, and the data processing device comprises a plurality of data transmitters associated one-to-one with the plurality of output queues, the data transmitters each reading and outputting data from the associated output queue.

29. The data processing device according to claim 28, wherein upon receiving data, the data receiver checks whether or not an alert flag indicating the higher priority data is set on the received data, stores data with the alert flag being set in the output queue, and stores data with no alert flag being set in the input queue.

30. A data processing device comprising:

a data receiver to receive data;

a plurality of input queues associated one-to-one with transmission sources of data received by the data receiver, the input queues each storing the data from the associated transmission source; and a data sorter to read data stored in each of the plurality of input queues from each of the input queues, and store the data in an output queue such that higher priority data is processed first, wherein the data sorter includes:

a plurality of data analyzers associated one-to-one with the plurality of input queues, the data analyzers each checking whether or not an alert flag indicating the higher priority data is set on data stored in the associated input queue, outputting data with the alert flag being set to the output queue, analyzing data with no alert flag being set to determine a priority level, and assigning the determined priority level to the analyzed data;

a plurality of data storages associated one-to-one with the plurality of data analyzers, the data storages each receiving data to which the priority level is assigned from the associated data analyzer and temporarily holding the received data; and a plurality of data readers associated one-to-one with the plurality of data storages, the data readers each reading data held in the associated data storage in order according to the assigned priority level, and outputting the read data to the output queue, and after reading all data stored in the associated input queue, the plurality of data analyzers each instruct the associated data reader to read data from the associated data storage.

31. The data processing device according to claim 30, wherein the output queue includes a plurality of output queues associated one-to-one with the plurality of input queues, the output queues each storing data read from the associated input queue by the data sorter, and the data processing device comprises a plurality of data transmitters associated one-to-one with the plurality of output queues, the data transmitters each reading and outputting data from the associated output queue.

32. The data processing device according to claim 31, wherein upon receiving data, the data receiver checks whether or not an alert flag indicating the higher priority data is set on the received data, stores data with the alert flag being set in the output queue, and stores data with no alert flag being set in the input queue.

* * * * *